No. 806,925. PATENTED DEC. 12, 1905.
J. T. SCOGIN.
TRACE HOOK.
APPLICATION FILED JULY 14, 1905.

Witnesses
R. A. Boswell
Hester E Drayton

Inventor
John T. Scogin,
By Franklin H. Hough
Attorney

UNITED STATES PATENT OFFICE.

JOHN T. SCOGIN, OF LUTHERSVILLE, GEORGIA.

TRACE-HOOK.

No. 806,925.   Specification of Letters Patent.   Patented Dec. 12, 1905.

Application filed July 14, 1905. Serial No. 269,687.

*To all whom it may concern:*

Be it known that I, JOHN T. SCOGIN, a citizen of the United States, residing at Luthersville, in the county of Meriwether and State of Georgia, have invented certain new and useful Improvements in Trace-Hooks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in trace or whiffletree hooks; and the object of the invention is to produce a simple and efficient device whereby a trace may be securely held to a whiffletree without the utilization of a snap-hook; and it consists in the peculiar construction and arrangement of apparatus, which will be hereinafter fully described and then defined in the appended claim.

My invention is illustrated in the accompanying drawings, in which—

Figure 1:
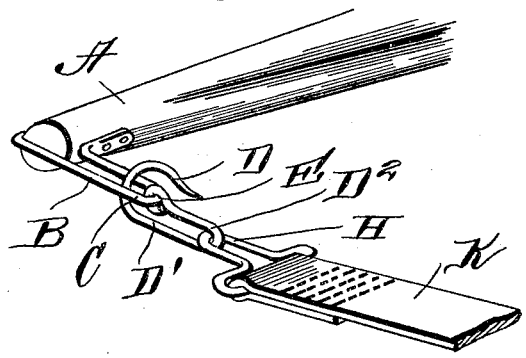
Figure 2:
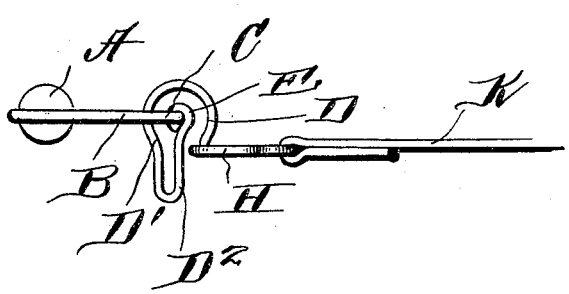
Figure 3:
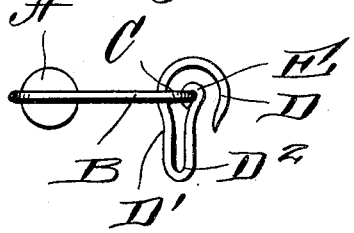

Figure 1 is a perspective view of an end of a whiffletree, showing my invention as applied thereto. Fig. 2 is a view showing the trace-hook reversed to allow the trace to be detached, and Fig. 3 is a view showing the normal position in which the trace-hook will be held by gravity when not connected to a trace.

Reference now being had to the details of the drawings by letter, A designates a whiffletree, and B is a rod secured thereto and having its ends fastened to the whiffletree at positions diametrically opposite, said bar having a U-shaped portion extending at right angles from the whiffletree with one of the legs of said U-shaped portion in contact with the end of the whiffletree.

D designates a hook having a shank portion D', which is bent upon itself at D² and has an eye E at its end, which engages the end of said loop and is positioned within the hook D. By providing the forwardly-projecting loop of the hook, as shown and described, and with the end of the hooked portion projecting over the eye, it will be noted that said hook will be normally held in the position shown in Fig. 3 of the drawings, in which gravity will assist in preventing the hook from turning, so as to disengage an eye H, fastened to the trace K.

In connecting the trace to a hook the hook is passed through the eye at the end of the trace and a complete rotary movement is imparted to the hook, which will cause the eye to follow the contour of the hook and engage in the forwardly-projecting loop and will be securely held thereto. In detaching the trace a reverse motion is imparted to the hook and the eye of the trace will readily detach, as will be understood.

While I have shown a particular shape of hook and apparatus as embodying my invention, it will be understood that I may vary the details of the same, if desired, without in any way departing from the spirit of the invention.

Having thus fully described my invention, what I claim as new, and desire to secure by Letters Patent, is—

In combination with a whiffletree, a bar B, the ends of which are fastened to the whiffletree at positions diametrically opposite, said bar having a U-shaped portion extending at right angles from the whiffletree with one of the legs of said U-shaped portion in contact with the end of the whiffletree, a hook having an eye engaging said U-shaped portion, the shank portion of said hook being bent upon itself forming a loop for the engagement of a trace-hook, the end of said hook extending through said U-shaped loop, as shown and described.

In testimony whereof I hereunto affix my signature in the presence of two witnesses.

JOHN T. SCOGIN.

Witnesses:
 I. O. ALBRIGHT,
 L. H. COLLEY.